United States Patent [19]
Durling et al.

[11] Patent Number: 5,421,300
[45] Date of Patent: Jun. 6, 1995

[54] TORCH JET SPARK PLUG

[75] Inventors: Harold E. Durling, Elsie; Robert P. Johnston; Kaius K. Polikarpus, both of Davison, all of Mich.

[73] Assignee: General Motors Corporation, Detroit, Mich.

[21] Appl. No.: 202,625

[22] Filed: Feb. 28, 1994

[51] Int. Cl.⁶ .............................................. F02B 19/00
[52] U.S. Cl. .................................................. 123/266
[58] Field of Search ................ 123/266, 260, 272, 259

[56] References Cited

U.S. PATENT DOCUMENTS

| | | | |
|---|---|---|---|
| 3,921,605 | 11/1975 | Wyczalek et al. | 123/143 B |
| 4,542,724 | 9/1985 | Blias | 123/266 |
| 4,924,829 | 5/1990 | Cheng et al. | 123/259 |
| 4,987,868 | 1/1991 | Richardson | 123/260 |
| 5,109,817 | 5/1992 | Cherry | 123/272 |
| 5,245,963 | 9/1993 | Sabol et al. | 123/266 |

Primary Examiner—Raymond A. Nelli
Attorney, Agent, or Firm—Charles K. Veenstra

[57] ABSTRACT

A torch jet spark plug is provided which is suitable for use in a torch jet-assisted spark ignition system for an internal combustion engine. The torch jet spark plug is configured to ignite an air/fuel mixture within a combustion prechamber formed integrally within the body of the spark plug, such that a jet emanates from the prechamber and projects into the main combustion chamber of the engine, so as to enhance the burning rate within the main chamber. More particularly, the spark plug is configured so as to be relatively unsusceptible to pre-ignition, and also substantially eliminates the occurrence of internal short circuits to ground due to deposits accumulating within the prechamber. The spark plug achieves each of the above objects while having a relatively uncomplicated structure, requiring a minimal number of discrete components so as to enhance its manufacturability.

20 Claims, 3 Drawing Sheets

TORCH JET SPARK PLUG

The present invention generally relates to spark plugs of the type for torch jet-assisted spark ignition of an air/fuel mixture within a main combustion chamber of an internal combustion engine, wherein ignition of an air/fuel mixture within a combustion prechamber creates a jet that increases the burning rate of the air/fuel mixture within the main combustion chamber. In particular, this invention relates to torch jet spark plugs which are resistant to pre-ignition and internal short circuiting, yet are relatively uncomplicated in their structure.

BACKGROUND OF THE INVENTION

Spark ignition of an air/fuel mixture within a combustion chamber of an internal combustion engine typically involves igniting the air/fuel mixture with an electric spark jumped between an electrode and a ground electrode of a spark plug. An alternative to spark ignition known in the art is torch jet-assisted spark ignition which, as taught by U.S. Pat. No. 3,921,605 to Wyczalek and U.S. Pat. No. 4,924,829 to Cheng et al., offers several advantages over spark ignition approaches. As the name suggests, torch jet-assisted spark ignition utilizes a jet of burning gases which is propelled into the combustion chamber in order to enhance the burning rate within the combustion chamber by providing increased turbulence as well as presenting a larger flame front area. As a result of a faster burning rate, lower cyclic variation in cylinder pressure is achieved, which enables a higher engine efficiency with a higher compression ratio.

In a torch jet-assisted spark ignition system, the jet typically emanates from a combustion prechamber, and passes through an orifice into the main combustion chamber. Though an air/fuel mixture can be introduced directly into the prechamber through a separate intake valve or fuel injector, it is generally preferable that the air/fuel mixture originate from the main chamber in order to simplify the construction of the engine and its ignition system. Furthermore, combustion of the air/fuel mixture within the prechamber can be initiated from within by a separate igniter, or can be initiated by the flame front within the main chamber. With either approach, combustion typically proceeds relatively simultaneously in both the prechamber and the main chamber. However, because of the small relative volume of the prechamber, a high pressure is developed in the prechamber while the pressure is still relatively low in the main chamber. As a result, a jet of burning gases shoots from the prechamber far into the main chamber, and thereby significantly increases the combustion rate in the main chamber.

Engine testing of torch jet spark plugs in accordance with U.S. Pat. No. 4,924,929 to Cheng et al. has verified that torch jet-assisted ignition results in faster burn rates than conventional spark ignition techniques. Yet, further enhancements in performance characteristics and capabilities, as well as improvements in manufacturability, would be highly desirable. Such improvements include a greater resistance to pre-ignition of the air/fuel mixture due to high operating temperatures. In particular, internal electrodes used to ignite the air/fuel mixture within the prechamber of a torch jet spark plug may become sufficiently hot to prematurely ignite the air/fuel mixture, creating the potential for both damage to the spark plug as well as to the engine. Another desirable improvement would be a construction which would eliminate the possibility of internal short circuits to ground forming within the spark plug as a result of deposits building up on the mating surfaces of the inner electrodes.

Thus, what is needed is a spark plug for a torch jet-assisted spark ignition system, wherein the spark plug is capable of generating a jet which increases the burning rate within a combustion chamber of an internal combustion engine, while also being resistant to pre-ignition and short circuiting. Yet, in order to assure that the spark plug is practical for mass production, the spark plug must also be relatively uncomplicated in its structure and construction so as to be relatively easy to manufacture.

SUMMARY OF THE INVENTION

It is an object of this invention to provide a spark plug which is configured to produce a jet for increasing the burning rate within a combustion chamber of an internal combustion engine.

It is another object of this invention that such a spark plug have an integrally formed prechamber from which the jet emanates, wherein the prechamber is provided with internal electrodes for igniting an air/fuel mixture within the prechamber.

It is yet another object of this invention that such a spark plug and its internal electrodes be configured so as to be resistant to pre-ignition at high operating temperatures.

It is a further object of this invention that such a spark plug be configured so as to substantially eliminate the creation of internal short circuits to ground caused by deposits building up within the prechamber.

It is still a further object of this invention that such a spark plug have a relatively uncomplicated construction requiring a minimal number of discrete components, so as to enhance the manufacturability of the spark plug.

In accordance with a preferred embodiment of this invention, these and other objects and advantages are accomplished as follows.

According to the present invention, there is provided a torch jet spark plug suitable for use in a torch jet-assisted spark ignition system for an internal combustion engine. The torch jet spark plug is configured to ignite a fuel mixture within a combustion prechamber formed integrally within the body of the spark plug, such that a jet emanates from the prechamber and projects into the main combustion chamber of the engine, so as to enhance burning within the main chamber. More particularly, the structure of the spark plug is such that the spark plug is relatively unsusceptible to pre-ignition at high operating temperatures, and also essentially eliminates the occurrence of internal short circuits to ground due to deposits accumulating within the prechamber. The spark plug achieves each of the above objects, yet has a relatively uncomplicated structure requiring a minimal number of discrete components, so as to enhance its manufacturability.

The spark plug of this invention generally includes a substantially electrically nonconductive, one piece body in which a chamber, or prechamber, is formed. The prechamber has a first end and an oppositely disposed second end which are preferably disposed along the longitudinal axis of the body. An orifice is formed in the body at the second end of the prechamber such that, when the spark plug is properly installed in an engine, the prechamber is vented through the orifice to the engine's combustion chamber. The orifice is sufficiently sized such that an air/fuel mixture introduced into the combustion chamber will also enter the prechamber during the engine's compression stroke.

A first inner electrode is disposed in the body so as to project into the prechamber, while an outer electrode is disposed at the end of the body which corresponds to the second end of the prechamber. A ground electrode is disposed adjacent the outer electrode so as to define an outer spark gap therewith. An electrically conductive member is disposed on the internal surface of the body, as defined by the prechamber, to form a second inner electrode which is electrically interconnected with the outer electrode. The second inner electrode is located on the internal surface of the prechamber such that it forms an inner spark gap with the first inner electrode. It is most preferable for manufacturing and durability reasons that the first inner electrode be disposed along the longitudinal axis of the body, such that the second inner electrode substantially circumscribes and is radially spaced from the first inner electrode, and such that the inner spark gap is a radial gap.

The inner spark gap is adapted to ignite the air/fuel mixture which is introduced into the prechamber during the engine's compression stroke. Preferably, the inner spark gap is spaced away from the orifice, for example, spaced a short distance from the first end of the prechamber. This configuration results in a jet of unburned air/fuel being ejected from the orifice when the spark plug is fired. The jet passes near the outer spark gap and is ignited by the flame kernel from that gap. The now burning jet carries the flame rapidly and deeply into the main combustion chamber.

The second inner electrode also serves to conduct an electric current to the outer electrode, such that a spark can be generated at the outer spark gap formed by the outer electrode and the ground electrode. In one embodiment, the outer electrode is formed to be integral with the second inner electrode, and is hollow in that the electrode is formed to be integral with the orifice. In operation, an electric current supplied to the first inner electrode will spark across the inner spark gap to the second inner electrode, and then continue to the outer electrode, at which point it will spark across the outer spark gap to the ground electrode. The spark at the inner spark gap serves to ignite the air/fuel mixture within the prechamber, while the spark at the outer spark gap serves to ignite the air/fuel mixture within the combustion chamber. Upon igniting the air/fuel mixture within the prechamber, expansion of the combustion gases and flame within the prechamber forms a jet which projects through the orifice and into the combustion chamber, as described above. As a result, the jet and the outer spark gap advantageously cooperate to combust the air/fuel mixture within the combustion chamber.

In accordance with the above, the spark plug of this invention is provided with a dedicated spark gap for igniting an air/fuel mixture within the combustion prechamber that is integrally formed within the body of the spark plug. As a result, the creation of the jet is not dependent on the progression of the flame front within the combustion chamber. Advantages of the spark plug of this invention include being resistant to pre-ignition at high operating temperatures, as well as providing for intimate thermal contact between the inner electrodes and the body of the spark plug. Enhancing thermal conduction between the inner electrodes and body further minimizes the inner electrodes' operating temperature.

Another advantage of the spark plug of this invention is that the inner spark gap is spaced away from the engine's combustion chamber, such that the jet initially includes an unburned portion of the air/fuel mixture within the prechamber. The unburned portion of the jet is ignited by the flame kernel from the outer spark gap, such that the burning jet carries the flame rapidly and deeply into the main combustion chamber. This feature is contrary to most prior art torch jet spark plugs with prechambers, in that the prior art does not employ outer spark gaps. Instead, prior art torch jet spark plugs have required that burning gases be expelled from the prechamber in order to ignite the air/fuel mixture in the main combustion chamber. However, misfires can occur with the prior art designs if the jet is quenched as it passes through the orifice, especially if the temperature of the spark plug is sufficiently low, such as at engine start up. The torch jet spark plug of this invention avoids the above shortcomings of the prior art by employing two ignition sources, one located outside of the prechamber and one located inside of the prechamber. The flame kernel within the prechamber is allowed to grow in all directions before reaching a prechamber wall, such that the prechamber pressure builds more rapidly than would be possible if the inner spark gap were located at the extreme end of the prechamber.

The spark plug of this invention is also resistant to electrical shorts caused by deposits building up in the prechamber. Because the body has a single piece construction and is electrically nonconductive, deposits which could accumulate on its internal surface within the prechamber cannot create a path to ground. Finally, because the prechamber, the second inner electrode, and the orifice are formed integral with the body of the spark plug, additional, discrete components to form these features are unnecessary. The second inner electrode can be formed by depositing an electrically conductive material directly to the internal surface of the prechamber, which also eliminates the requirement for a specially designed component. As such, the spark plug of this invention has a relatively uncomplicated design requiring a minimal number of discrete components, so as to enhance the manufacturability of the spark plug.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

The present invention provides a torch jet spark plug which is adapted for use in a torch jet-assisted spark ignition system for an internal combustion engine. As with torch jet spark plugs known in the prior art, the torch jet spark plug of this invention serves to increase the burning rate of an air/fuel mixture within a combustion chamber of an internal combustion engine by igniting an air/fuel mixture within a combustion prechamber which is associated with the spark plug. While those skilled in the art will recognize that the present invention is constructed to be particularly suitable for use in an automotive internal combustion engine, the teachings of the present invention are also applicable to other spark plug configurations, as well as other applications which utilize internal combustion processes for power generation.

Figures 1, 2:
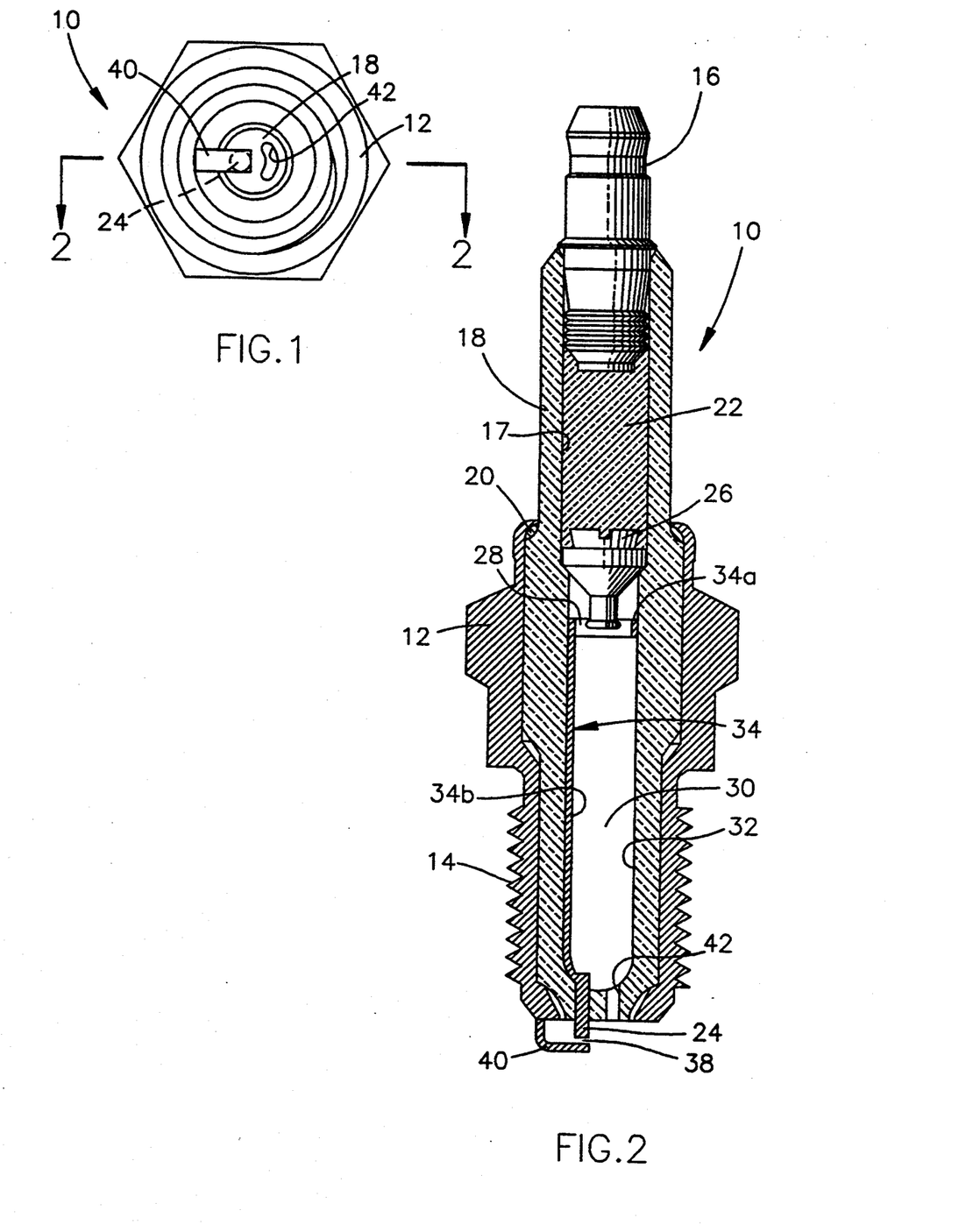
FIG. 1 shows an end view of a torch jet spark plug in accordance with a first embodiment of this invention.
FIG. 2 shows a cross-sectional view of the spark plug along line 2—2 of FIG. 1.

FIGS. 1 and 2 depict a torch jet spark plug 10 in accordance with a first embodiment of this invention. As with spark plugs typically used with internal combustion engines, the spark plug 10 includes a shell 12 formed from a steel, such as SAE 1008. External threads 14 are formed at one end of the shell 12 for the purpose of installing the spark plug 10 into a threaded hole in a wall of a combustion chamber within an internal combustion engine (not shown). An insulator body 18 formed from a ceramic material, such as alumina ($Al_2O_3$), is secured within the shell 12 in any suitable manner, such as by crimping as shown. A gasket 20 of a suitable temperature resistant material, such as copper or soft steel, is provided between the shell 12 and the insulator body 18 to create a gas tight seal therebetween. The insulator body 18 projects through the end of the shell 12 opposite the threads 14. The portion of the body 18 which projects from the shell 12 has a passage 17 which receives an upper terminal 16, by which an electric current can be supplied to the spark plug 10. Located at the end of the spark plug 10 opposite the upper terminal 16 is a ground terminal 40. As is conventional, the ground terminal 40 may be an L-shaped metal member welded to the shell 12, allowing the shell 12 to conduct electric current to the engine block.

As seen in FIG. 2, an electric current introduced at the upper terminal 16 is conducted to the ground terminal 40 through a resistor material 22 disposed in the passage 17 in the insulator body 18 and a series of intermediate electrodes disposed in a chamber, or prechamber 30, formed within the insulator body 18. As is conventional, the resistor material 22 is preferably a glass seal resistor material of a type known in the art, which provides electromagnetic interference suppression while also hermetically sealing the passage 17 from the prechamber 30. The series of electrodes include an upper electrode 26 which projects into the prechamber 30 from the passage 17, an inner electrode 34 which is disposed on the internal surface 32 of the prechamber 30, and an outer electrode 24 located adjacent a via hole, or orifice 42, in the prechamber 30. As shown, the outer electrode 24 is a metal wire which projects through the lower wall of the prechamber 30 so as to form an outer spark gap 38 with the ground terminal 40.

The prechamber 30 is preferably elongated and extends along the longitudinal axis of the insulator body 18, such that the upper electrode 26 projects into an upper end of the prechamber 30 while the orifice 42 is disposed at a lower end. The orifice 42 serves to vent the prechamber 30 to the main combustion chamber of an engine in which the spark plug 10 is installed. As shown in FIG. 1, the orifice 42 is generally kidney-shaped and is offset from the longitudinal axis of the insulator body 18 and the outer spark gap 38 formed between the outer electrode 24 and the ground terminal 40. As such, an electric spark generated at the outer spark gap 38 does not occur within the flow of combustion gases exiting from the prechamber 30. This feature is useful since it has been found that under some conditions, the jet can be strong enough to extinguish the flame kernel at the outer spark gap 38, and therefore cause a misfire. Positioning the outer spark gap 38 near the jet orifice 42 but out of its direct path reduces the tendency for misfire caused by a powerful jet.

The volume of the prechamber 30 and the area of the orifice 42 can be selected to provide the desired characteristics for a particular engine and effect that is of interest. For a given prechamber volume, a relatively small orifice area restricts the exit of gasses from the prechamber 30 causing higher prechamber pressures and higher velocity jets when the plug 10 is fired, while a relatively large orifice area results in softer, lower velocity jets. Excessively small orifices 42 restrict filling of the prechamber 30 during the engine compression stroke, especially at high engine speeds. Larger prechamber volumes produce longer duration jets, but may be difficult to package within a spark plug body. In addition, large prechamber volumes introduce additional surface area to the combustion chamber, which is undesirable from the standpoint of heat loss and exhaust emissions.

From the above, it can be seen that there is no single preferred prechamber volume and orifice area combination for all engines, and persons skilled in the art will recognize the advantage of various combinations. For illustrative purposes, one such combination which has been found to perform suitably involves the use of a prechamber 30 whose volume is on the order of about 0.3 to about 1.0 cubic centimeters, in combination with an orifice 42 having a cross-sectional area of about 1.5 to about 12 square millimeters. The above combination has been found to allow a sufficient charge of air/fuel mixture to enter the prechamber 30 during the engine's compression stroke, while enabling a suitable jet to form upon ignition of the air/fuel mixture during the engine's combustion stroke. However, in view of the earlier discussion, it is foreseeable that smaller or larger prechambers 30 and orifices 42 could be satisfactorily employed in lieu of the combination just described.

According to the first embodiment of this invention, the inner electrode 34 includes an upper band 34a which circumscribes the upper electrode 26 to form a radial inner spark gap 28, and a metal "stripe" 34b which interconnects the upper band 34a with the outer electrode 24. Forming the inner electrode 34 in this manner is advantageous in that it reduces the complexity of the spark plug 10 by eliminating the requirement for two or more discrete components which must be assembled with the insulator body 18. The inner electrode 34 can be a discrete electrode member affixed to the internal surface 32 of the prechamber 30. However, in a preferred embodiment the inner electrode 34 is formed by depositing a metal paste on the internal surface 32 of the prechamber 30 while the insulator body 18 is in a "green" state prior to firing. During firing, the carrier component of the metal paste is dissipated, and the metal component wets and adheres to the internal surface 32 of the prechamber 30 to form a metal layer having a thickness of preferably about 0.01 to about 0.6 millimeters. Most preferably, the metal component is a catalytically-active conductive material, such as a platinum or palladium alloy metal paste, though noncatalytic metals may also be employed where catalytic activity is not required. With the use of catalytically-active materials, precombustion chemical reactions are promoted during engine compression which enhance the ignitability of the air/fuel mixture within the prechamber 30. Since the prechamber mixture ignites and spreads the flame to the air/fuel mixture in the main combustion chamber, a robust ignition event is achieved in the main combustion chamber using less electrical energy for the spark than would be required otherwise.

As noted above, the upper band 34a of the inner electrode 34 does not electrically contact the upper electrode 26, but forms a radial gap therewith. The radial gap defines the inner spark gap 28 across which an electric spark can jump for the purpose of igniting an air/fuel mixture within the prechamber 30. Because the upper band 34a of the inner electrode 34 completely circumscribes the upper electrode 26, the inner spark gap 28 is generally annular-shaped. As noted before, the outer spark gap 38 is formed between the outer terminal 24 and the ground terminal 40. In that the ground terminal 40 is axially aligned with the outer terminal 24, the outer spark gap 38 is an axial gap across which an electric spark can jump to ignite an air/fuel mixture within the engine's combustion chamber in which the spark plug 10 is installed.

From the above, it can be seen that, upon charging the prechamber 30 with a suitable air/fuel mixture from an engine's main combustion chamber during a compression stroke, an electric current supplied to the spark plug 10 via the upper terminal 16 will generate an electric spark at the inner spark gap 28, which will ignite the air/fuel mixture within the prechamber 30. Thereafter, the electric current will be conducted through the inner electrode 34 to the outer electrode 24, where a second spark will be generated at the outer spark gap 38 to ignite the air/fuel mixture within the main combustion chamber. Though combustion proceeds relatively simultaneously in both the prechamber 30 and the main chamber, the small relative volume of the prechamber 30 results in a high pressure being developed within the prechamber 30 while the pressure within the main combustion chamber is still relatively low. As a result, a jet which initially includes an unburned portion of the prechamber's air/fuel mixture will be expelled from the prechamber 30, become ignited by the external flame kernel of the outer spark gap 38, and then travel far into the main chamber, thereby significantly increasing the combustion rate within the main chamber.

Figures 3, 4:
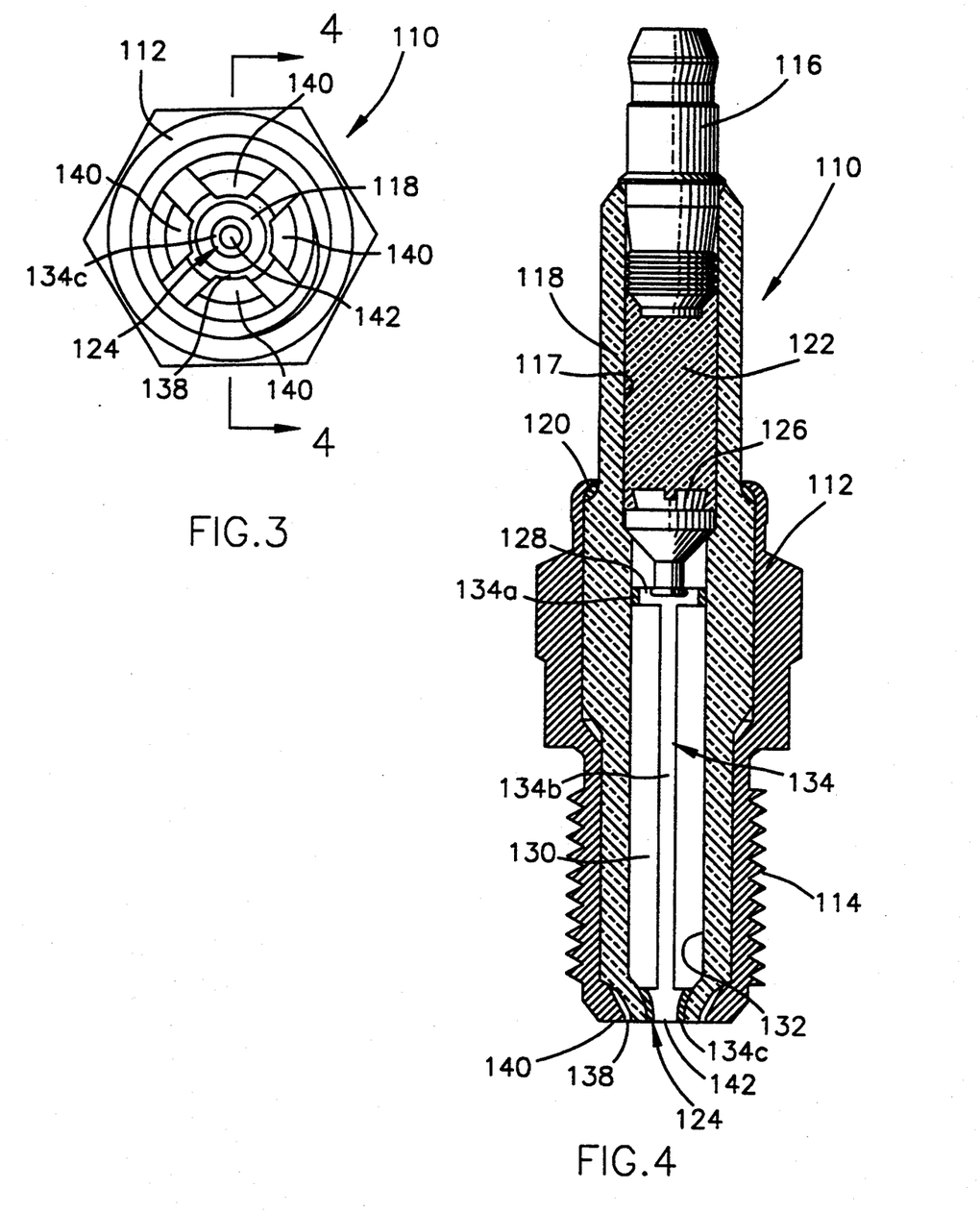
FIG. 3 shows an end view of a torch jet spark plug in accordance with a second embodiment of this invention.
FIG. 4 shows a cross-sectional view of the spark plug along line 4—4 of FIG. 3.

A spark plug 110 in accordance with a second embodiment of this invention is shown in FIGS. 3 and 4. As seen in FIG. 4, the spark plug 110 is similar in construction to the spark plug 10 of the first embodiment. For example, the spark plug 110 includes a steel shell 112 having external threads 114 formed at one end, an insulator body 118 secured within the shell 112, an upper terminal 116 received within a passage 117 in the insulator body 118, and a ground terminal 140 at the opposite end of the spark plug 110. The spark plug 110 further includes a prechamber 130 and, in series, a resistor material and seal 122 disposed in the passage 117, an upper electrode 126 which projects into the prechamber 130 from the passage 117, an inner electrode 134 which is disposed on the internal surface 132 of the prechamber 130, and an outer, hollow electrode 124 formed on the walls of an orifice 142 in the prechamber 130. The inner electrode 134 includes an upper band 134a which circumscribes the upper electrode 126 to form a radial inner spark gap 128, a lower band 134c located in the orifice 142, and a metal stripe 134b which interconnects the upper and lower bands 134a and 134c. In general, the materials, sizes and functions of the above features are essentially the same as that noted for the spark plug 10 of the first embodiment.

Most notably, and in contrast to the first embodiment of this invention, the hollow electrode 124 is not formed as a metal wire which projects through the lower wall of the prechamber 130, but instead is formed by the lower band 134c of the inner electrode 134 so as to be integral with the orifice 142 of the prechamber 130. The inner electrode 134 and the hollow electrode 124 are both preferably formed by an adherent metal coating on the internal surface 132 of the prechamber 130, in a manner generally similar to that described for the first embodiment. The orifice 142 is located at the longitudinal axis of the insulator body 118 so as to maintain the symmetry of the insulator body 118, and thereby enable its forming when using an isopressing operation. Accordingly, the hollow electrode 124 serves two distinct functions. First, the hollow electrode 124 acts as an extension of the inner electrode 134 to form one electrode of the outer spark gap 138. Secondly, the hollow electrode 124 defines the orifice 142 necessary for the intake of the air/fuel mixture during the compression stroke as well as the expulsion of the combustion gases upon ignition of the air/fuel mixture within the prechamber 130. Advantageously, by combining the physical features which form the spark plug's lower electrode and orifice, the design and manufacture of the spark plug 110 is significantly facilitated.

Another preferred aspect of the second embodiment is the structure of the ground terminal 140 which forms an outer spark gap 138 with the hollow terminal 124. As seen in FIGS. 3 and 4, the ground terminal 140 is composed of four prongs, though fewer or more prongs could foreseeably be utilized. Each prong extends radially inward toward the perimeter of the hollow terminal 124, such that the outer spark gap 138 is radially oriented in a manner somewhat similar to the inner spark gap 128. An advantage of this structure is the availability of separate locations across which an electric spark can jump from the hollow electrode 124 to the ground terminal 130. As such, the electric spark will jump to the prong offering the path of least resistance, keeping the sparking voltage at a minimum level and thus improving engine performance, particularly during extended engine operation which could cause electrode erosion, leading to increased sparking voltage requirements.

Figure 5:
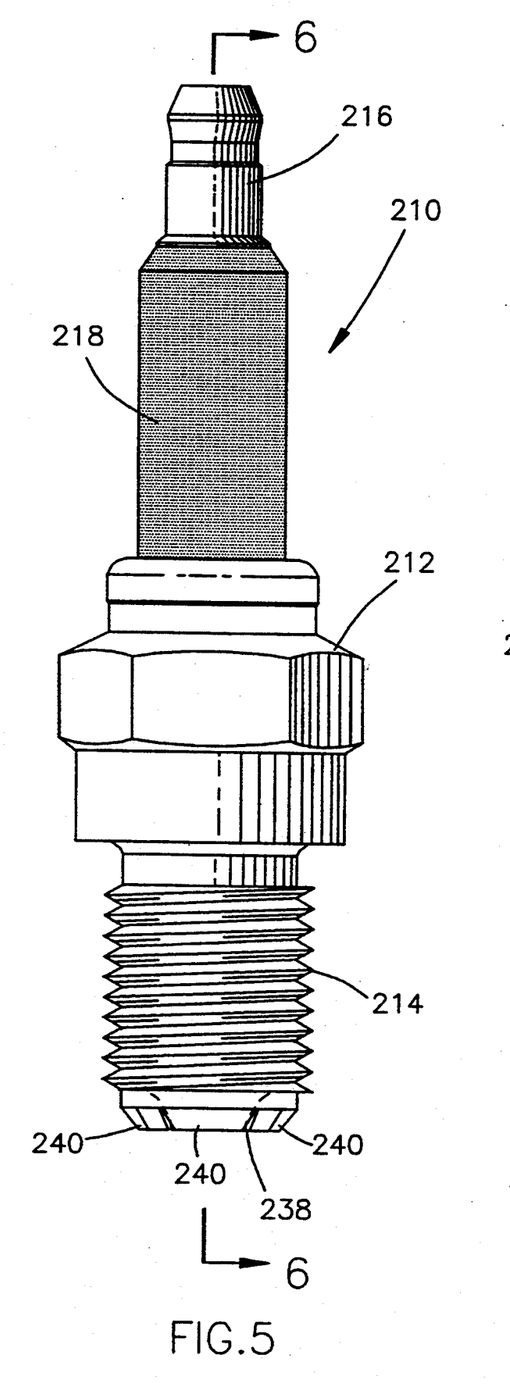
FIG. 5 shows an exterior side view of a torch jet spark plug in accordance with a third embodiment of this invention.
Figure 6:
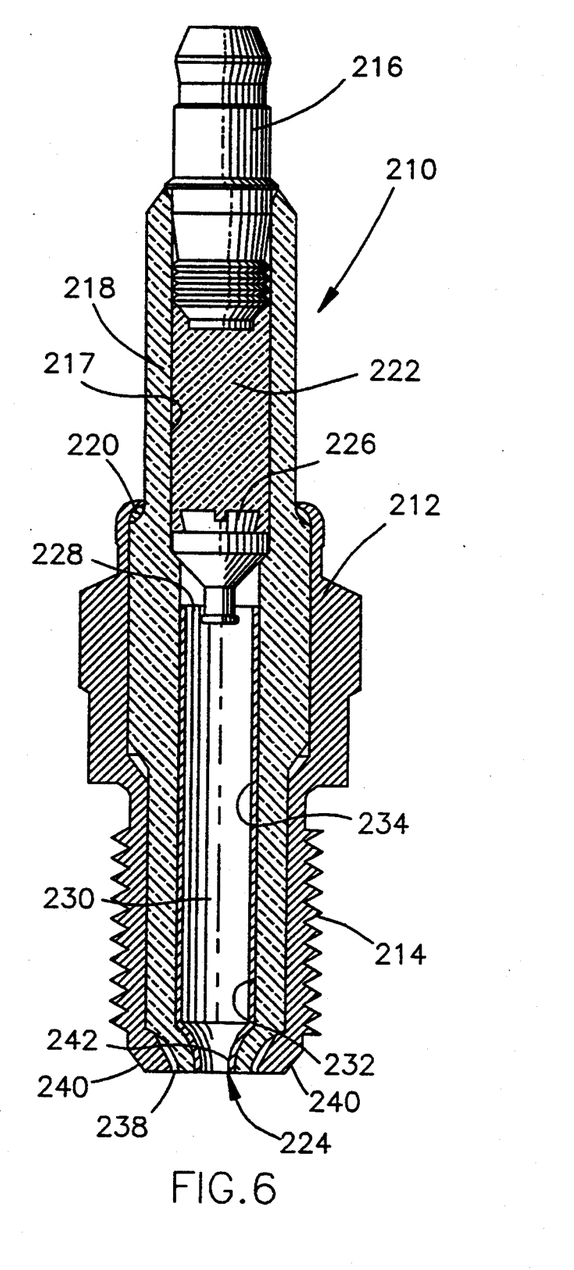
FIG. 6 shows a cross-sectional side view of the spark plug of FIG. 5 along line 6—6 of FIG. 5.

Finally, a spark plug 210 in accordance with a third embodiment of this invention is shown in FIGS. 5 and 6. As seen in FIG. 6, the spark plug 210 is similar in construction to the spark plug 110 of the second embodiment, in that the spark plug 210 includes a steel shell 212 with external threads 214, an insulator body 218, an upper terminal 216, and a ground terminal 240 at the opposite end of the spark plug 210. The spark plug 210 further includes a prechamber 230 and, in series, a resistor material and seal 222, an upper electrode 226, and an inner electrode 234 disposed on the internal surface 232 of the prechamber 230. As with the second embodiment of this invention, the hollow electrode 224 is formed to be integral with the orifice 242 of the prechamber 230. As before, the inner electrode 234 is electrically interconnected with the outer electrode 224, and also forms a radial inner spark gap 228 across which an electric spark can be generated to ignite an air/fuel mixture within the prechamber 230.

Both the inner electrode 234 and hollow electrode 224 are preferably formed by an adherent metal coating on the internal surface 232 of the prechamber 230. However, in contrast to the first and second embodiments, the inner electrode 234 is formed on substantially the entire internal surface 232 of the prechamber 230 below the upper electrode 226, as shown in FIG. 6, such that an electrical capacitor is effectively formed. The inner electrode 234 is one plate of the capacitor, the insulator body 218 is the dielectric separator, and the shell 212 is the second plate of the capacitor. The capacitor is electrically in parallel with the outer spark gap 238. When a high voltage is applied to the upper terminal 216 to fire the spark plug 210, the capacitor will maintain the inner electrode 234 at ground potential until the inner spark gap 228 breaks down. The capacitor charges as current flows through the gap 228, until the electrical potential across the outer spark gap 238 causes it to break down and ignite the fuel mixture within the main chamber. As a result, the electric sparks which occur at the inner spark gap 228 and the outer spark gap 238 will fire sequentially rather than simultaneously, so as to produce the torch jet effect while also reducing the peak voltage levels required to fire the two gaps 228 and 238 of the spark plug 210. Accordingly, the electrical demands placed on the ignition coil and wiring will also be reduced. In addition, if the electrode 234 is composed of a catalytically-active material, the large surface area of the electrode 234 will enhance the catalytic reaction rate as compared to the electrodes 34 and 134 of the first and second embodiments.

In accordance with the embodiments described above, a primary feature of each of the spark plugs 10, 110 and 210 of this invention is that the spark plugs are able to enhance the burning rate within the engine's main combustion chamber. Specifically, the jet created by the spark plugs 10, 110 and 210 increases the turbulence within the main combustion chamber, as well as presents a larger flame front area within the main combustion chamber. As a result of a faster burning rate, lower cyclic variation in cylinder pressure is achieved, which enables a higher engine efficiency by utilizing a higher compression ratio. Such a capability is advantageous for enhancing engine power and retaining satisfactory fuel economy. Other performance-related advantages include improved idle stability and knock resistance under high loads at low engine speeds.

In addition, each spark plug is configured to be resistant to pre-ignition at high operating temperatures. More specifically, each is provided with a pair of inner electrodes (upper and inner electrodes 26 and 34, 126 and 134, and 226 and 234, respectively) which form an inner spark gap (28, 128, 228) that is spaced away from the spark plug's outer spark gap (38, 138, 238) and the engine's combustion chamber. Because each of the inner electrodes (26, 34; 126, 134; 226, 234) are in close thermal contact with the insulator body (18, 118, 218), heat can be more readily conducted away, so as to further reduce their operating temperatures. Furthermore, this configuration produces a jet which initially includes an unburned portion of the air/fuel mixture. The jet is ignited as it passes near the external flame kernel, and continues on to rapidly ignite the main charge in the combustion chamber. The combination of inner and outer spark gaps and the jet of unburned air/fuel mixture eliminates misfires caused by flame quenching of a burning jet passing through a small orifice, The orifice diameter can be smaller in the present invention than would be practical if a flame had to propagate through the opening. This allows even a relatively small prechamber volume to produce a powerful jet for fast ignition.

The spark plugs 10, 110, and 210 of this invention are also resistant to electrical shorts caused by deposits building up in their prechambers (30, 130, 230). Because their insulator bodies (18, 118, 218) are of one piece construction and formed from electrically nonconductive material, deposits which will tend to accumulate on their internal surfaces (32, 132, 232) within their prechambers (30, 130, 230) cannot create a path which would produce an internal electrical short to ground. In fact, such an accumulation would serve to conduct an electric current to the outer electrode (24, 124, 224) in essentially the same manner as the inner electrode (34, 134, 234). Furthermore, the prechambers (30, 130, 230) and orifices (42, 142, 242) of the spark plugs of this invention are formed integrally with the insulator bodies (18, 118, 218) of the spark plugs, such that additional and discrete components are not required to form these features. Finally, the inner electrodes (34, 134, 234) and the outer electrodes (124, 224) are formed by depositing an electrically conductive material directly on the internal surfaces (32, 132, 232) of the prechamber (30, 130, 230), which also eliminates the requirement for specially designed and discrete components to perform their functions. As such, each of the spark plugs of this invention has a relatively uncomplicated design requiring a minimal number of discrete components, so as to enhance the manufacturability of the spark plug.

While our invention has been described in terms of a preferred embodiment, it is apparent that other forms could be adopted by one skilled in the art, for example, by substituting appropriate materials, interchanging certain features of the disclosed embodiments, or by utilizing the teachings of this invention in an alternative environment. Accordingly, the scope of our invention is to be limited only by the following claims.

The embodiments of the invention in which an exclusive property or privilege is claimed are defined as follows:

1. A torch jet spark ignition device for promoting the burning rate of an air/fuel mixture within a combustion chamber of an internal combustion engine, the device comprising:
  a substantially electrically nonconductive one-piece body having a chamber formed therein, said chamber having a first end and an oppositely disposed second end, said body having an orifice at said second end of said chamber for venting said chamber to said combustion chamber;
  an inner electrode disposed in said body so as to project into said chamber;
  an outer electrode disposed at an end of said body corresponding to said second end of said chamber;

a ground electrode disposed adjacent said outer electrode so as to define an outer spark gap therewith; and an electrically conductive material disposed on a surface of said chamber so as to define an inner spark gap with said inner electrode and so as to be electrically interconnected with said outer electrode;

whereby said inner spark gap is adapted to ignite a portion of said air/fuel mixture which is introduced into said chamber so as to create a jet which includes an unburned portion of said air/fuel mixture, said jet being expelled through said orifice and into said combustion chamber, and whereby said electrically conductive material serves to conduct an electric current to said outer electrode, such that said jet and said outer spark gap ignite said air/fuel mixture in said combustion chamber.

2. A torch jet spark ignition device as recited in claim 1 wherein said electrically conductive material comprises a band which circumscribes said inner electrode such that said inner spark gap is a radial spark gap.

3. A torch jet spark ignition device as recited in claim 1 wherein said electrically conductive material is disposed on substantially all of said surface of said chamber below said inner electrode, such that said electrically conductive material circumscribes said inner electrode and such that said inner spark gap is a radial spark gap.

4. A torch jet spark ignition device as recited in claim 1 wherein said electrically conductive material is disposed on a surface defined by said orifice so as to form said outer electrode.

5. A torch jet spark ignition device as recited in claim 1 wherein said ground terminal is spaced axially from said outer electrode such that said outer spark gap is an axial spark gap.

6. A torch jet spark ignition device as recited in claim 1 wherein said ground terminal is spaced radially from said outer electrode such that said outer spark gap is a radial spark gap.

7. A torch jet spark ignition device as recited in claim 1 wherein said electrically conductive material is a catalytically-active conductive metal.

8. A spark plug for promoting the burning rate of an air/fuel mixture within a combustion chamber of an internal combustion engine, the spark plug comprising:

a substantially electrically nonconductive one-piece body having a chamber formed therein, said chamber having a first end and an oppositely disposed second end, said body having an orifice at said second end of said chamber for venting said chamber to said combustion chamber;

an inner electrode disposed in said body so as to project into said first end of said chamber;

an outer electrode disposed at an end of said body corresponding to said second end of said chamber;

an electrically conductive material disposed on a surface of said chamber so as to substantially circumscribe said inner electrode and thereby define a radial spark gap with said inner electrode, and so as to be electrically interconnected with said outer electrode; and a ground electrode disposed adjacent said outer electrode so as to define an outer spark gap therewith;

whereby said radial spark gap is adapted to ignite a portion of said air/fuel mixture which is introduced into said chamber so as to create a jet which includes an unburned portion of said air/fuel mixture, said jet being expelled through said orifice and into said combustion chamber, and whereby said electrically conductive material serves to conduct an electric current to said outer electrode, such that said jet and said outer spark gap ignite said air/fuel mixture in said combustion chamber.

9. A spark plug as recited in claim 8 wherein said electrically conductive material is disposed on substantially all of said surface of said chamber below said inner electrode.

10. A spark plug as recited in claim 8 wherein said electrically conductive material is disposed on a surface defined by said orifice so as to form said outer electrode.

11. A spark plug as recited in claim 8 wherein said orifice is offset from a longitudinal axis of said body, and wherein said electrically conductive material comprises:

a first band which circumscribes said inner electrode so as to form said radial spark gap; and a stripe which electrically interconnects said first band with said ground electrode.

12. A spark plug as recited in claim 8 wherein said ground terminal is spaced axially from said outer electrode such that said outer spark gap is an axial spark gap.

13. A spark plug as recited in claim 8 wherein said ground terminal is spaced radially from said outer electrode such that said outer spark gap is a radial spark gap.

14. A spark plug as recited in claim 8 wherein said electrically conductive material is a catalytically-active conductive metal.

15. A spark plug as recited in claim 8 wherein said orifice is centrally located at said second end of said chamber.

16. A spark plug as recited in claim 8 wherein said orifice is offset from a longitudinal axis of said body.

17. A torch jet spark plug for achieving torch jet-assisted spark ignition so as to promote the burning rate of an air/fuel mixture within a combustion chamber of an internal combustion engine, the torch jet spark plug comprising:

a substantially electrically nonconductive one-piece body having a substantially cylindrical-shaped chamber formed therein, said chamber having a first end and an oppositely disposed second end, said body having an orifice at said second end of said chamber for venting said chamber to said combustion chamber;

an inner electrode disposed in said body so as to project into said first end of said chamber;

an electrically conductive material disposed on a surface of said chamber at said first end so as to substantially circumscribe said inner electrode and thereby define an inner radial spark gap with said inner electrode, said electrically conductive material being disposed on said surface so as to extend to said second end of said chamber and into said orifice, such that said electrically conductive material forms an outer electrode at said orifice; and a ground electrode substantially circumscribing said outer electrode so as to define an outer radial spark gap therewith;

whereby said inner radial spark gap is adapted to ignite a portion of said air/fuel mixture which is introduced into said chamber so as to create a jet which includes an unburned portion of said air/fuel mixture, said jet being expelled through said orifice and into said combustion chamber, and whereby said electrically conductive material serves to conduct an electric current to said outer electrode, such that said jet and said outer radial spark gap ignite said air/fuel mixture in said combustion chamber.

18. A torch jet spark plug as recited in claim 17 wherein said electrically conductive material is disposed on substantially all of said surface of said chamber below said inner electrode.

19. A torch jet spark plug as recited in claim 17 wherein said orifice is centrally located at said second end of said chamber.

20. A torch jet spark plug as recited in claim 17 wherein said electrically conductive material is a catalytically-active conductive material.

* * * * *